(12) United States Patent
Clark

(10) Patent No.: US 10,966,370 B1
(45) Date of Patent: Apr. 6, 2021

(54) LAWN MOWER TRIMMER ATTACHMENT

(71) Applicant: Billy Clark, Elloree, SC (US)

(72) Inventor: Billy Clark, Elloree, SC (US)

( * ) Notice: Subject to any disclaimer, the term of this patent is extended or adjusted under 35 U.S.C. 154(b) by 56 days.

(21) Appl. No.: 16/364,296

(22) Filed: Mar. 26, 2019

(51) Int. Cl.
| | |
|---|---|
| *A01D 43/00* | (2006.01) |
| *A01D 34/64* | (2006.01) |
| *A01D 34/416* | (2006.01) |
| *A01D 101/00* | (2006.01) |

(52) U.S. Cl.
CPC .......... *A01D 43/00* (2013.01); *A01D 34/416* (2013.01); *A01D 34/64* (2013.01); *A01D 2101/00* (2013.01)

(58) Field of Classification Search
CPC ........ A01D 43/00; A01D 43/16; A01D 34/64; A01D 34/84; A01D 34/416
See application file for complete search history.

(56) References Cited

U.S. PATENT DOCUMENTS

| | | | | |
|---|---|---|---|---|
| 2,643,856 | A * | 6/1953 | Sales .................. | B66F 3/24 254/264 |
| 3,138,912 | A * | 6/1964 | Mays .................. | A01D 46/00 56/328.1 |
| 4,182,100 | A * | 1/1980 | Letter ................. | A01D 34/416 172/17 |
| 5,303,532 | A | 4/1994 | Phillips | |
| 5,561,969 | A | 10/1996 | Sandy | |
| 5,694,752 | A | 12/1997 | Warfield, III | |
| 5,809,758 | A | 9/1998 | Flanigan | |
| 5,970,694 | A * | 10/1999 | Knox, Jr. .......... | A01D 34/001 172/17 |
| 6,415,585 | B2 * | 7/2002 | Morabit ............. | A01D 34/416 30/276 |
| 6,601,374 | B2 * | 8/2003 | Smith ................ | A01D 43/16 56/12.7 |
| 6,966,168 | B1 * | 11/2005 | Kerr, Sr. .......... | A01D 34/001 56/12.7 |
| 6,986,238 | B1 * | 1/2006 | Bloodworth ..... | A01D 34/82 56/12.7 |
| 7,028,455 | B1 * | 4/2006 | Liguras ............ | A01D 34/001 56/13.6 |
| 7,219,488 | B2 * | 5/2007 | Hatfield ........... | A01D 34/001 56/12.7 |

(Continued)

FOREIGN PATENT DOCUMENTS

| | | | | |
|---|---|---|---|---|
| CN | 108432462 A | * | 8/2018 | .......... A01D 46/247 |
| WO | 1996028011 | | 9/1996 | |

*Primary Examiner* — Thomas B Will
*Assistant Examiner* — Madeline Ivy Runco

(57) ABSTRACT

The lawn mower trimming attachment is configured for use with a lawn mower. The lawn mower trimming attachment is configured for use with a string trimmer. The lawn mower trimming attachment attaches the string trimmer to the lawn mower such that the string trimmer can be operated from the lawn mower. The lawn mower trimming attachment is a rotating structure such that the string trimmer can be rotated into position. The lawn mower trimming attachment has an adjustable elevation such that the angle of attack of the working element of the string trimmer can be adjusted. The lawn mower trimming attachment comprises the string trimmer, the lawn mower, an extension apparatus, and a pedestal. The pedestal attaches the extension apparatus to the lawn mower. The extension apparatus attaches the string trimmer to the pedestal.

15 Claims, 5 Drawing Sheets

(56) References Cited

U.S. PATENT DOCUMENTS

| | | | |
|---|---|---|---|
| 7,644,565 B2* | 1/2010 | Uihlein | A01D 34/84 |
| | | | 56/13.7 |
| 7,712,293 B1* | 5/2010 | Recker | A01D 75/008 |
| | | | 56/14.9 |
| D616,904 S | 6/2010 | Armstrong | |
| D661,320 S * | 6/2012 | Armstrong | D15/17 |
| 8,322,121 B1 | 12/2012 | Marcell | |
| 8,667,648 B2* | 3/2014 | Vierck | A01D 34/416 |
| | | | 16/426 |
| 8,973,343 B2 | 3/2015 | Bell | |
| 2004/0237491 A1* | 12/2004 | Heighton | A01D 34/416 |
| | | | 56/12.7 |
| 2010/0000192 A1 | 1/2010 | Robison | |
| 2014/0260839 A1* | 9/2014 | Hurley | B25F 5/026 |
| | | | 81/489 |
| 2014/0283388 A1* | 9/2014 | Dedmon | A01D 34/4166 |
| | | | 30/122 |
| 2018/0139900 A1* | 5/2018 | Pendleton | A01D 34/58 |
| 2019/0053428 A1* | 2/2019 | Parker | F16M 11/2085 |

\* cited by examiner

LAWN MOWER TRIMMER ATTACHMENT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture including harvesting and mowing, more specifically, a mowing apparatus of a harvester adapted for the purpose of edging a field close to trees and walls. (A01D34/84)

SUMMARY OF INVENTION

The lawn mower trimming attachment is configured for use with a lawn mower. The lawn mower trimming attachment is configured for use with a string trimmer. The lawn mower trimming attachment attaches the string trimmer to the lawn mower such that the string trimmer can be operated from the lawn mower. The lawn mower trimming attachment is a rotating structure such that the string trimmer can be rotated into position. The lawn mower trimming attachment has an adjustable of the string trimmer can be adjusted. The lawn mower trimming attachment comprises the string trimmer, the lawn mower, an extension apparatus, and a pedestal. The pedestal attaches the extension apparatus to the lawn mower. The extension apparatus attaches the string trimmer to the pedestal.

These together with additional objects, features and advantages of the lawn mower trimming attachment will be readily apparent to those of ordinary skill in the art upon reading the following detailed description of the presently preferred, but nonetheless illustrative, embodiments when taken in conjunction with the accompanying drawings.

In this respect, before explaining the current embodiments of the lawn mower trimming attachment in detail, it is to be understood that the lawn mower trimming attachment is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the lawn mower trimming attachment.

It is therefore important that the claims be regarded as including such equivalent construction insofar as they do not attachment. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
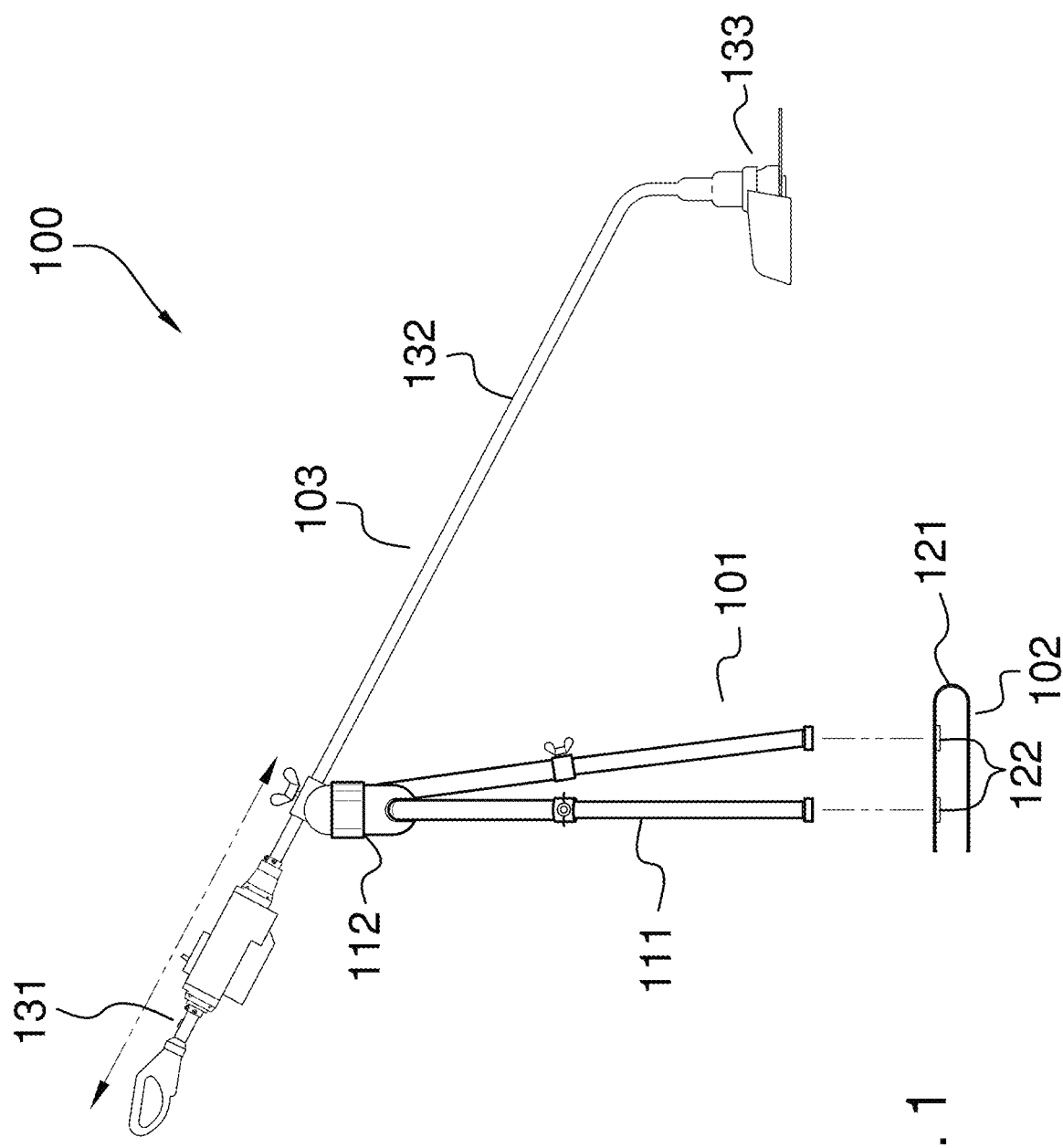
FIG. 1 is a side view of an embodiment of the disclosure.
Figure 2:
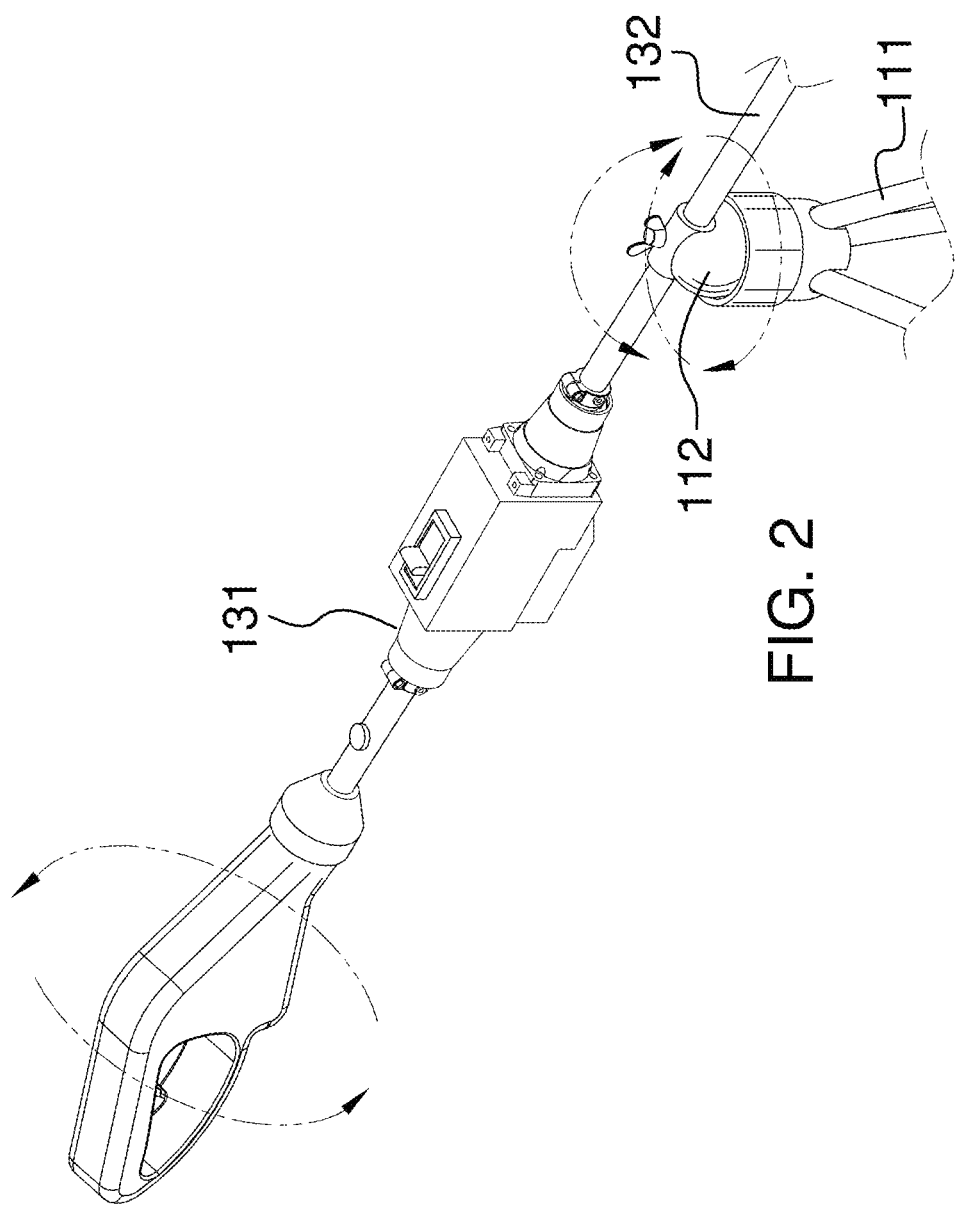
FIG. 2 is a detail view of an embodiment of the disclosure.
Figure 3:
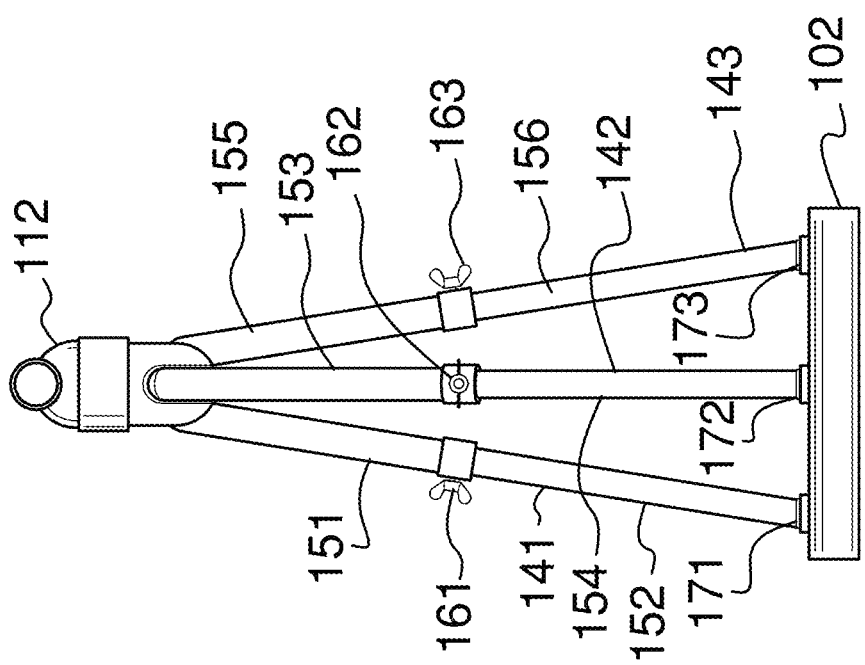
FIG. 3 is a front view of an embodiment of the disclosure.
Figure 4:
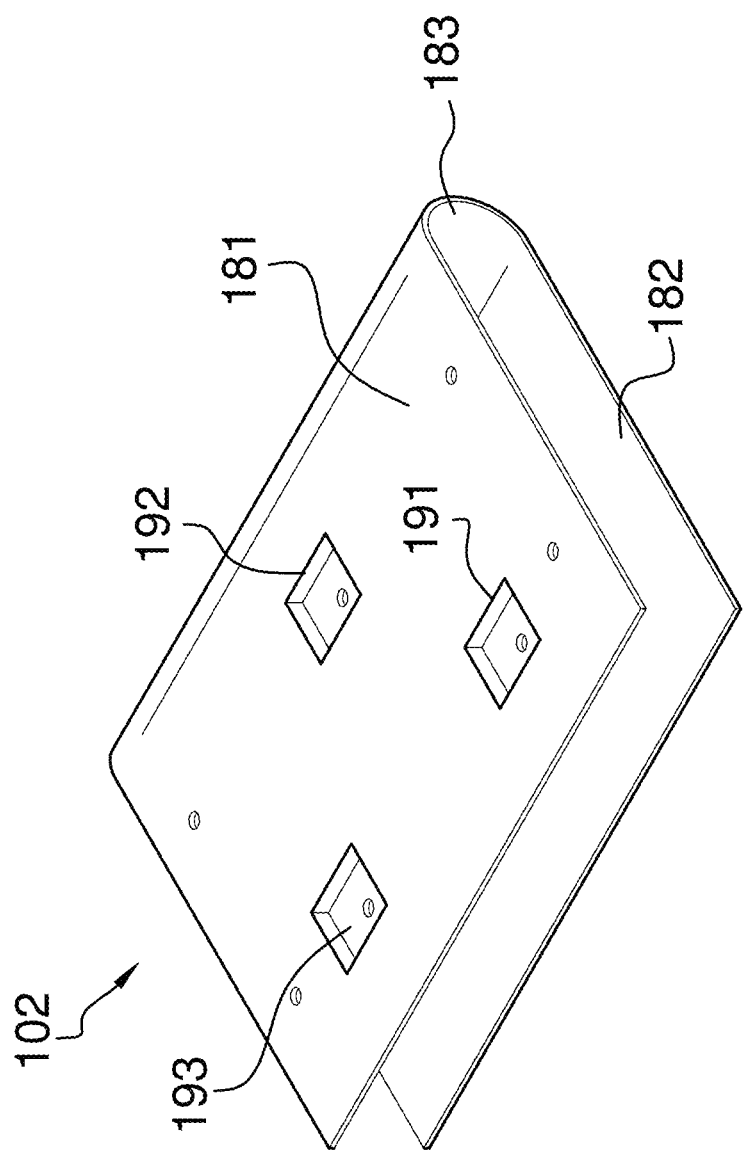
FIG. 4 is a detail view of an embodiment of the disclosure.
Figure 5:
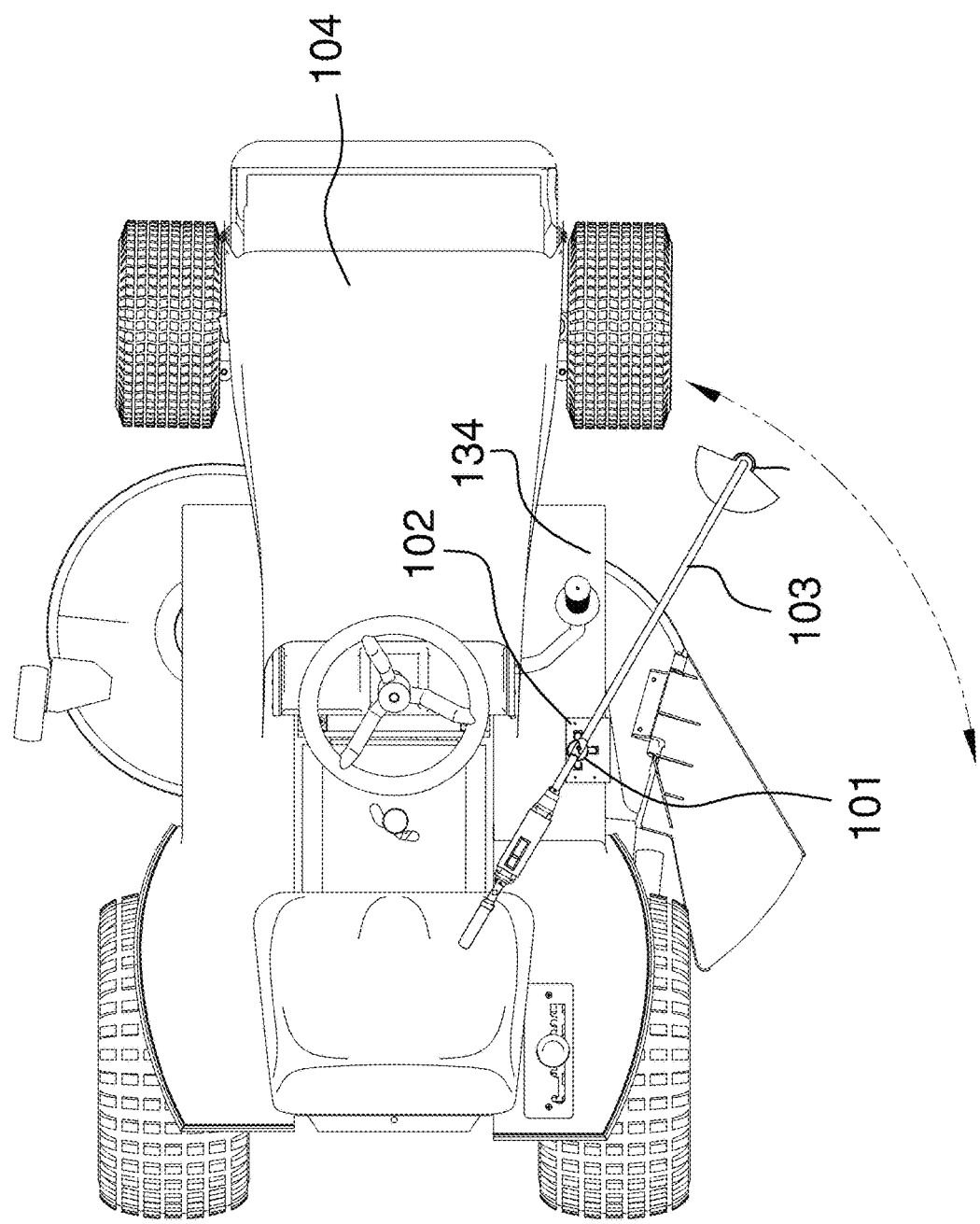
FIG. 5 is an in-use view of an embodiment of the disclosure.

Detailed reference will now be made to one or more potential embodiments of the disclosure, which are illustrated in FIGS. 1 through 5.

The lawn mower trimming attachment 100 (hereinafter invention) is configured for use with a lawn mower 104. The invention 100 is configured for use with a string trimmer 103. The invention 100 attaches the string trimmer 103 to the lawn mower 104 such that the string trimmer 103 can operate from the lawn mower 104. The invention 100 is a rotating structure such that the string trimmer 103 can rotate into position. The invention 100 has an adjustable elevation such that the angle of attack of the working element 133 of the string trimmer 103 can be adjusted. The invention 100 comprises the string trimmer 103, the lawn mower 104, an extension apparatus 101, and a pedestal 102. The pedestal 102 attaches the extension apparatus 101 to the lawn mower 104. The extension apparatus 101 attaches the string trimmer 103 to the pedestal 102.

The string trimmer 103 is a power tool commonly used to cut grass. The string trimmer 103 is commonly used to trim grass near walls and trees. The string trimmer 103 is defined in greater detail elsewhere in this disclosure. The string trimmer 103 further comprises a handle 131, an extension structure 132, and a working element 133. The handle 131 is a grip used to manipulate the position of the string trimmer 103. The handle 131 contains the controls used to operate the string trimmer 103. The extension structure 132 is a shaft that attaches the working element 133 of the string trimmer 103 to the handle 131 of the string trimmer 103. The extension structure 132 removably attaches to the rotating element of the universal joint 112 of the extension apparatus 101. The working element 133 forms the working element 133 of the string trimmer 103 used to cut grass.

The lawn mower 104 is a power tool commonly used to cut the grass in a lawn. The lawn mower 104 is defined in greater detail elsewhere in this disclosure. The lawn mower 104 further of the superior surface of the lawn mower 104. The pedestal 102 mounts on the cutting deck 134 of the lawn mower 104.

The extension apparatus 101 is a mechanical structure. The extension apparatus 101 attaches the string trimmer 103 to the pedestal 102. The extension apparatus 101 is a telescopic device. The extension apparatus 101 is adjustable such that the elevation of the string trimmer 103 above the lawn mower 104 is adjustable. The extension apparatus 101 rotates such that the string trimmer 103 rotates into position for use. The extension apparatus 101 forms a load path that transfers the full load of the string trimmer 103 to the pedestal 102. The extension apparatus 101 comprises a telescopic structure 111 and a universal joint 112.

The telescopic structure 111 is the mechanical structure of the extension apparatus 101 that adjusts the elevation of the string trimmer 103. The telescopic structure 111 has a tripod structure. The telescopic structure 111 has a telescopic configuration. The telescopic structure 111 attaches the universal joint 112 to the pedestal 102. The telescopic structure 111 forms a load path that transfers the full load of the string trimmer 103 and the universal joint 112 to the pedestal 102. The telescopic structure 111 comprises a first telescopic stanchion 141, a second telescopic stanchion 142, and The first telescopic stanchion 141 is a telescopic device that comprises a first arm 151, a second arm 152, and a first detent 161. The first detent 161 is a mechanical device that locks and secures the first arm 151 to the second arm 152. The first arm 151 is a hollow prism that is further defined with an inner dimension. The second arm 152 is a hollow prism that is further defined with an outer dimension. The second arm 152 is geometrically similar to the first arm 151.

The span of the outer dimension of the second arm 152 is lesser than the span of the inner dimension of the first arm 151 such that the second arm 152 inserts into the first arm 151 in a telescopic fashion to form a composite prism. The span of the length of the first telescopic stanchion 141 adjusts by adjusting the relative position of the second arm 152 within the first arm 151. The position of the second arm 152 relative to the first arm 151 is held in position using the first detent 161. The first detent 161 is selected from the group consisting of a cotter pin, a G snap collar, a cam lock collar, a threaded clutch, a split collar lock, and a spring-loaded ball lock.

The first telescopic stanchion 141 further comprises a first footing 171. The first footing 171 is a prism-shaped structure. The first footing 171 has a disk shape. The first footing 171 attaches to the end of the first telescopic footing 171 is geometrically similar to the first mortise 191 such that the first footing 171 inserts into the first mortise 191 to removably attach the first telescopic stanchion 141 to the hyoid 121 of the pedestal 102.

The second telescopic stanchion 142 is a telescopic device that comprises a third arm 153, a fourth arm 154, and a second detent 162. The second detent 162 is a mechanical device that locks and secures the fourth arm 154 to the third arm 153. The third arm 153 is a hollow prism that is further defined with an inner dimension. The fourth arm 154 is a hollow prism that is further defined with an outer dimension. The fourth arm 154 is geometrically similar to the third arm 153.

The span of the outer dimension of the fourth arm 154 is lesser than the span of the inner dimension of the third arm 153 such that the fourth arm 154 inserts into the third arm 153 in a telescopic fashion to form a composite prism. The span of the length of the second telescopic stanchion 142 adjusts by adjusting the relative position of the fourth arm 154 within the third arm 153. The position of the fourth arm 154 relative to the third arm 153 is held in position using the second detent 162. The second detent 162 is selected from the group consisting of a cotter pin, a G snap collar, a cam lock collar, a threaded clutch, a split collar lock, and a spring-loaded ball The second telescopic stanchion 142 further comprises a second footing 172. The second footing 172 is a prism-shaped structure. The second footing 172 has a disk shape. The second footing 172 attaches to the end of the second telescopic stanchion 142 to form a composite prism structure. The second footing 172 is geometrically similar to the second mortise 192 such that the second footing 172 inserts into the second mortise 192 to removably attach the second telescopic stanchion 142 to the hyoid 121 of the pedestal 102.

The third telescopic stanchion 143 is a telescopic device that comprises a fifth arm 155, a sixth arm 156, and a third detent 163. The third detent 163 is a mechanical device that locks and secures the fifth arm 155 to the sixth arm 156. The fifth arm 155 is a hollow prism that is further defined with an inner dimension. The sixth arm 156 is a hollow prism that is further defined with an outer dimension. The sixth arm 156 is geometrically similar to the fifth arm 155.

The span of the outer dimension of the sixth arm 156 is lesser than the span of the inner dimension of the fifth arm 155 such that the sixth arm 156 inserts into the fifth arm 155 in a telescopic fashion to form a composite prism. The span of the length of the third telescopic stanchion 143 adjusts by adjusting the relative position of the sixth arm 156 within the fifth arm 155 is held in position using the third detent 163. The third detent 163 is selected from the group consisting of a cotter pin, a G snap collar, a cam lock collar, a threaded clutch, a split collar lock, and a spring-loaded ball lock.

The third telescopic stanchion 143 further comprises a third footing 173. The third footing 173 is a prism-shaped structure. The third footing 173 has a disk shape. The third footing 173 attaches to the end of the third telescopic stanchion 143 to form a composite prism structure. The third footing 173 is geometrically similar to the third mortise 193 such that the third footing 173 inserts into the third mortise 193 to removably attach the third telescopic stanchion 143 to the hyoid 121 of the pedestal 102.

The universal joint 112 is a structure that attaches the string trimmer 103 to the telescopic structure 111 such that the string trimmer 103 will rotate around at least two perpendicular axes. The universal joint 112 is a locking structure such that the angle of attack of the working element 133 of the string trimmer 103 can lock into position. In the first potential embodiment of the disclosure, the universal joint 112 is a locking ball and socket joint.

The pedestal 102 attaches the extension apparatus 101 to the cutting deck 134 of the lawn mower 104. The pedestal 102 forms a load path that transfers the full load of the string trimmer 103 and the extension apparatus 101 to the lawn mower 104. The extension apparatus 101 removably attaches to the pedestal 102. The pedestal 102 comprises a hyoid 121 and a plurality of mortises 122.

The hyoid 121 is a mechanical structure. The hyoid 121 has a hyoid-shape. The hyoid 121 forms the load path that transfers the load of the string trimmer 103 and the extension apparatus 101 to the cutting deck 134 of the lawn mower 104. The hyoid 121 comprises a superior plate 181, an inferior plate 182, and a crossbeam 183.

The inferior plate 182 is an arm of the hyoid-shape of the hyoid 121. The inferior plate 182 has a rectangular disk structure. The inferior plate 182 attaches directly to the cutting deck 134 of the lawn mower 104 such that the hyoid 121 attaches to the lawn mower 104. The superior plate 181 is an arm of the hyoid-shape of the hyoid 121. The superior plate 181 has a rectangular disk structure. The superior plate 181 is the arm of the hyoid-shape of the hyoid 121 that is distal to the inferior plate 182. The superior plate 181 forms the superior surface of the hyoid 121. The plurality of mortises 122 are formed in the superior plate 181 of the hyoid 121. The crossbeam 183 is the crossbeam 183 of the hyoid 121. The structure of the hyoid 121 is defined in greater detail elsewhere in this disclosure.

Each of the plurality of mortises 122 is a mortise that is formed in the superior plate 181 of the hyoid 121. Each of the plurality of mortises 122 is sized to receive the footing of a telescopic stanchion of the telescopic structure 111. Each of the plurality of mortises 122 receives the footing of the telescopic stanchion in the manner of a mortise and tenon such that the telescopic stanchion removably attaches to the pedestal 102. By attaching each telescopic stanchion selected from the telescopic structure 111, the plurality of mortises 122 removably attach the extension apparatus 101 to the hyoid 121 of the pedestal 102. The plurality of mortises 122 comprises a first mortise 191, a second mortise 192, and a third mortise 193.

The first mortise 191 is a negative space that forms a cavity in the superior plate 181 of the hyoid 121. The first mortise 191 is geometrically similar to the first footing 171 such that the first footing 171 removably inserts into the first mortise 191. The second mortise 192 is a negative space that forms a cavity in the superior plate 181 of the hyoid 121. The second mortise 192 is geometrically similar to the second footing 172 such that the second footing 172 removably inserts into the second mortise 192. The third mortise 193 is a negative space that forms a cavity in the superior plate 181 of the hyoid 121. The third mortise 193 is geometrically similar to the third footing 173 such that the third footing 173 removably inserts into the third mortise 193.

The following four paragraphs describe the assembly of the invention 100.

The first footing 171 attaches to the end of the second arm 152 that is distal to the first arm 151. The second footing 172 attaches to the end of the fourth arm 154 that is distal to the third arm 153. The third footing 173 attaches to the end of the sixth arm 156 that is distal to the fifth arm 155.

The end of the first arm 151 that is distal from the second arm 152 attaches to the universal joint 112. The end of the third arm 153 that is distal from the fourth arm 154 attaches to the universal joint 112. The end of the fifth arm 155 that is distal from the sixth arm 156 attaches to the universal joint 112.

The inferior plate 182 of the hyoid 121 attaches to the cutting deck 134 of the lawn mower 104. The first footing 171 inserts into the first mortise 191 in the manner of a tenon inserting into a mortise. The second footing 172 inserts into the second mortise 192 in the manner of a tenon inserting into a mortise. The third footing 173 inserts into the third mortise.

The extension structure 132 of the string trimmer 103 attaches to the universal joint 112 such that the universal joint 112 freely rotates the string trimmer 103.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Angle of Attack: As used in this disclosure, the angle of attack refers to the angle formed between a plane of rotation relative to a reference line or plane.

Ball and Socket Joint: As used in this disclosure, a ball and socket joint means a manufactured joint, coupling, or fitting in which a partially spherical object lies in a socket, allowing for multidirectional movement and rotation within limits determined by the construction of the ball and socket joint. The ball and socket joint is a type of universal joint.

Cavity: As used in this disclosure, a cavity is an empty space or negative space that is formed within an object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinders, prisms or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond is used as a comparison between two or more objects wherein one or more properties shared by the two or more objects match, agree, or align within acceptable manufacturing tolerances.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggests otherwise, the specified horizontal surface is the supporting surface the potential embodiment of the disclosure rests on. The infinitive form of elevation is to elevate.

Extension Apparatus: As used in this disclosure, an extension apparatus is a mechanical structure that is used to extend or bridge the reach between any two objects.

Extension Structure: As used in this disclosure, an extension structure is an inert physical structure that is used to extend or bridge the reach between any two objects.

Footing: As used in this disclosure, a footing refers to one of a plurality of small pedestals that combine to: a) raise an object above a supporting surface; and, b) transfer the load path of the object to the supporting surface.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides is equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grass: As used in this disclosure, the term grass refers to a plant that is classified within the family Poaceae. The Poaceae family contains the cereal grasses. The Poaceae is also referred to as Gramineae.

Grip: As used in this disclosure, a grip is an accommodation formed on or within an object that allows the object to be grasped or manipulated by a hand.

Hand Tools or Portable Power Tools: As used in this disclosure, a hand tool or a portable power tool is considered to be a device that is classified, or would reasonably be expected to be classified, within the Cooperative Patent Classification system.

Handle: As used in this disclosure, a handle is an object by which a tool, object, or door is held or manipulated with the hand.

Hyoid: As used in this disclosure, a hyoid refers to a three-sided structure comprising a crossbeam, a first arm, and a second arm. In a hyoid, the first arm and the second arm project away from the crossbeam: 1) in the same direction; 2) at a roughly perpendicular angle to the crossbeam, and, 3) the span of length of the first arm roughly equals the span of length of the second arm. Hyoids generally have a U shaped appearance.

Inner Dimension: As used in this disclosure, the term inner dimension describes the span from a first inside or interior surface of a container to a second inside or interior surface of a container. The term is used in much the same way that a plumber would refer to the inner diameter of a pipe.

Lawn: As used in this disclosure, a lawn refers to a field that grows grass.

Lawn Mower: As used in this disclosure, a lawn mower is a mechanical device that is used to cut the grass of a lawn to a uniform height. Lawn mowers are typically powered tools. The lawn mower is often classified into a category selected from the group consisting of a "push" lawn mower and a "riding" lawn mower.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Monofilament: As used in this disclosure, a monofilament refers to a yarn or a cord that is formed from a single continuous filament.

Mortise: As used in this disclosure, a mortise is a cavity formed in a material that is designed to receive a similarly shaped object such that the similarly shaped object is flush to the surface of the material.

Negative Space: As used in this disclosure, negative space is a method of defining an object through the use of open or empty space as the definition of the object itself, or, through the use of open or empty space to describe the boundaries of an object.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pedestal: As used in this disclosure, a pedestal is an intermediary load-bearing structure that that transfers a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Plant: As used in this disclosure, a plant is a biological organism: 1) that is not capable of movement over significant distances; and 2) that uses photosynthesis to create nutrients. A stationary biological organism that is not capable of movement over significant distances but does not use photosynthesis is referred to as a parasitic plant. In the vernacular, the term plant will often include parasitic plants. The intention of this disclosure is to include parasitic plants in the definition of plant.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radial: As used in this disclosure, the term radial refers to a direction that: 1) is perpendicular to an identified central axis; or, 2) projects away from a center point.

String Trimmer: As used in this disclosure, a string trimmer is a power tool. The string trimmer is a power tool that uses a monofilament cord as its working element. The string trimmer is a rotating tool that rotates the monofilament cord at high speed such that the monofilament cord will cut plants such as grass. The terms weed whacker and weed eater are synonyms for a string trimmer.

Telescopic: As used in this disclosure, telescopic is an adjective that describes an object made of sections that fit or slide into each other such that the object can be made longer or shorter by adjusting the relative positions of the sections.

Tenon: As used in this disclosure, a tenon is a structure that projects away from an edge a first object (often the end of a piece of wood). The tenon is sized and shaped to fit into a mortise that is formed in a second object such that the first object can be attached to the second object by inserting the tenon in the matching mortise.

Tool: As used in this disclosure, a tool is a device, an apparatus, or an instrument that is used to carry out an activity, operation, or procedure.

Tripod: As used in this disclosure, a tripod is a three-legged structure that forms a load path.

Universal Joint: As used in this disclosure, a universal joint is a method of joining a first shaft to a second shaft such that the center axis of the first shaft and is offset from the center axis of the second shaft. The offset angle is adjustable. When a universal joint is formed with a locking mechanism, a universal joint can further be used to lock the offset angle between the first shaft and the second shaft into a fixed position. Universal joints are often used to transfer rotation from the first shaft to rotate the second shaft.

Weed: As used in this disclosure, a weed refers to an unwanted plant growing in a cultivated space. When used as a verb, to weed means to remove one or more weeds from the cultivated space.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A mowing apparatus comprising:

an extension apparatus and a pedestal;

wherein the pedestal attaches the extension apparatus to a lawn mower;

wherein the extension apparatus attaches a string trimmer to the pedestal;

wherein the mowing apparatus is configured for use with a lawn mower;

wherein the mowing apparatus is configured for use with a string trimmer;

wherein the mowing apparatus attaches the string trimmer to the lawn mower;

wherein the mowing apparatus is a rotating structure such that the string trimmer can rotate into a position;

wherein the mowing apparatus has an adjustable elevation such that an angle of attack of a string adjusts;

wherein the string trimmer further comprises a handle, an extension structure, and a working element;

wherein the extension structure is a shaft that attaches the working element of the string trimmer to the handle of the string trimmer;

wherein the lawn mower further comprises a cutting deck;

wherein the cutting deck is a portion of a superior surface of the lawn mower;

wherein the extension apparatus comprises a telescopic structure and a universal joint;

wherein the telescopic structure is the mechanical structure of the extension apparatus that adjusts the elevation of the string trimmer;

wherein the extension apparatus removably attaches to the pedestal;

wherein the universal joint is a structure that attaches the string trimmer to the telescopic structure such that the string trimmer will rotate around at least two perpendicular axes;

wherein the extension structure removably attaches to the rotating element of the universal joint;

wherein the universal joint is a locking structure such that the angle of attack of the working element of the string trimmer can lock into position;

wherein the pedestal is further defined with a hyoid;

wherein the hyoid comprises a superior plate, an inferior plate, and a crossbeam;

wherein the inferior plate is an arm of the hyoid-shape of the hyoid;

wherein the inferior plate has a rectangular disk structure;

wherein the inferior plate attaches directly to the cutting deck of the lawn mower such that the hyoid attaches to the lawn mower;

wherein the superior plate is an arm of the hyoid-shape of the hyoid;

wherein the superior plate has a rectangular disk structure;

wherein the superior plate is the arm of the hyoid-shape of the hyoid that is distal to the inferior plate;
wherein the superior plate forms the superior surface of the hyoid;
wherein the plurality of mortises are formed in the superior plate of the hyoid;
wherein the crossbeam is the crossbeam of the hyoid.

2. The mowing apparatus according to claim 1
wherein the extension apparatus is a mechanical structure;
wherein the extension apparatus attaches the string trimmer to the pedestal;
wherein the extension apparatus is a telescopic device;
wherein the extension apparatus is adjustable such that the elevation of the string trimmer above the lawn mower is adjustable;
wherein the extension apparatus rotates such that the string trimmer rotates;
wherein the extension apparatus forms a load path that transfers a full load of the string trimmer to the pedestal.

3. The mowing apparatus according to claim 2
wherein the pedestal attaches the extension apparatus to the cutting deck of the lawn mower;
wherein the pedestal forms a load path that transfers the full load of the string trimmer and the extension apparatus to the lawn mower.

4. The mowing apparatus according to claim 3
wherein the telescopic structure has a tripod structure;
wherein the telescopic structure attaches the universal joint to the pedestal;
wherein the telescopic structure forms a load path that transfers the full load of the string trimmer and the universal joint to the pedestal.

5. The mowing apparatus according to claim 4
wherein the telescopic structure comprises a first telescopic stanchion, a second telescopic stanchion, and a third telescopic stanchion;
wherein the first telescopic stanchion is a telescopic device that comprises a first arm, a second arm, and a first detent;
wherein the first detent is a mechanical device that locks and secures the first arm to the second arm;
wherein the second telescopic stanchion is a telescopic device that comprises a third arm, a fourth arm, and a second detent;
wherein the second detent is a mechanical device that locks and secures the fourth arm to the third arm;
wherein the third telescopic stanchion is a telescopic device that comprises a fifth arm, a sixth arm, and a third detent;
wherein the third detent is a mechanical device that locks and secures the fifth arm to the sixth arm.

6. The mowing apparatus according to claim 5
wherein the first arm is a hollow prism that is further defined with an inner dimension;
wherein the second arm is a hollow prism that is further defined with an outer dimension;
wherein the second arm is geometrically similar to the first arm;
wherein the span of the outer dimension of the second arm is lesser than the span of the inner dimension of the first arm such that the second arm inserts into the first arm in a telescopic fashion to form a composite prism;
wherein the third arm is a hollow prism that is further defined with an inner dimension;
wherein the fourth arm is a hollow prism that is further defined with an outer dimension;
wherein the fourth arm is geometrically similar to the third arm;
wherein the span of the outer dimension of the fourth arm is lesser than the span of the inner dimension of the third arm such that the fourth arm inserts into the third arm in a telescopic fashion to form a composite prism;
wherein the fifth arm is a hollow prism that is further defined with an inner dimension;
wherein the sixth arm is a hollow prism that is further defined with an outer dimension;
wherein the sixth arm is geometrically similar to the fifth arm;
wherein the span of the outer dimension of the sixth arm is lesser than the span of the inner dimension of the fifth arm such that the sixth arm inserts into the fifth arm in a telescopic fashion to form a composite prism.

7. The mowing apparatus according to claim 6
wherein the span of the length of the first telescopic stanchion adjusts by adjusting a relative position of the second arm within the first arm;
wherein the relative position of the second arm with respect to the first arm is held in position using the first detent;
wherein the span of the length of the second telescopic stanchion adjusts by adjusting a relative position of the fourth arm within the third arm;
wherein the relative position of the fourth arm with respect to the third arm is held in position using the second detent;
wherein the span of the length of the third telescopic stanchion adjusts by adjusting a relative position of the sixth arm within the fifth arm;
wherein the relative position of the sixth arm with respect to the fifth arm is held in position using the third detent.

8. The mowing apparatus according to claim 7
wherein the first telescopic stanchion further comprises a first footing;
wherein the first footing is a prism-shaped structure;
wherein the first footing has a disk shape;
wherein the second telescopic stanchion further comprises a second footing;
wherein the second footing is a prism-shaped structure;
wherein the second footing has a disk shape;
wherein the third telescopic stanchion further comprises a third footing;
wherein the third footing is a prism-shaped structure;
wherein the third footing has a disk shape.

9. The mowing apparatus according to claim 8
wherein the first footing attaches to the end of the first telescopic stanchion to form a composite prism structure;
wherein the second footing attaches to the end of the second telescopic stanchion to form a composite prism structure;
wherein the third footing attaches to the end of the third telescopic stanchion to form a composite prism structure;
wherein the first footing is geometrically similar to a first mortise such that the first footing inserts into the first mortise to removably attach the first telescopic stanchion to the hyoid of the pedestal;
wherein the second footing is geometrically similar to a second mortise such that the second footing inserts into the second mortise to removably attach the second telescopic stanchion to the hyoid of the pedestal;
wherein the third footing is geometrically similar to a third mortise such that the third footing inserts into the third mortise to removably attach the third telescopic stanchion to the hyoid of the pedestal.

10. The mowing apparatus according to claim 9
wherein the pedestal comprises the hyoid and a plurality of mortises;
wherein the plurality of mortises are formed in the hyoid.

11. The mowing apparatus according to claim 10
wherein the hyoid is a mechanical structure;
wherein the hyoid has a hyoid-shape;
wherein the hyoid forms the load path that transfers the load of the string trimmer and the extension apparatus to the cutting deck of the lawn mower.

12. The mowing apparatus according to claim 11
wherein each of the plurality of mortises is a mortise that is formed in the superior plate of the hyoid;
wherein each of the plurality of mortises is sized to receive the footing of a telescopic stanchion of the telescopic structure;
wherein each of the plurality of mortises receives the footing of the telescopic stanchion in the manner of a mortise and tenon such that the telescopic stanchion removably attaches to the pedestal.

13. The mowing apparatus according to claim 12
wherein the plurality of mortises comprises the first mortise, the second mortise, and the third mortise;
wherein the first mortise is a negative space that forms a cavity in the superior plate of the hyoid;
wherein the second mortise is a negative space that forms a cavity in the superior plate of the hyoid;
wherein the third mortise is a negative space that forms a cavity in the superior plate of the hyoid.

14. The mowing apparatus according to claim 13
wherein the first mortise is geometrically similar to the first footing such that the first footing removably inserts into the first mortise;
wherein the second mortise is geometrically similar to the second footing such that the second footing removably inserts into the second mortise;
wherein the third mortise is geometrically similar to the third footing such that the third footing removably inserts into the third mortise.

15. The mowing apparatus according to claim 14
wherein the first footing attaches to the end of the second arm that is distal to the first arm;
wherein the second footing attaches to the end of the fourth arm that is distal to the third arm;
wherein the third footing attaches to the end of the sixth arm that is distal to the fifth arm;
wherein the end of the first arm that is distal from the second arm attaches to the universal joint;
wherein the end of the third arm that is distal from the fourth arm attaches to the universal joint;
wherein the end of the fifth arm that is distal from the sixth arm attaches to the universal joint;
wherein the inferior plate of the hyoid attaches to the cutting deck of the lawn mower;
wherein the first footing inserts into the first mortise in the manner of a tenon inserting into a mortise;
wherein the second footing inserts into the second mortise in the manner of a tenon inserting into a mortise;
wherein the third footing inserts into the third mortise in the manner of a tenon inserting into a mortise;
wherein the extension structure of the string trimmer attaches to the universal joint such that the universal joint freely rotates the string trimmer;
wherein the universal joint is a locking ball and socket joint.

* * * * *